United States Patent
Lebrun et al.

[19]

[11] Patent Number: 6,092,546
[45] Date of Patent: Jul. 25, 2000

[54] FUEL FLOW DIVIDER AND PRESSURIZING VALVE FOR GAS TURBINE

[75] Inventors: Ivan P. Lebrun, Granger; Paul W. Futa, Jr., North Liberty, both of Ind.

[73] Assignee: AlliedSignal Inc., Morristown, N.J.

[21] Appl. No.: 08/989,606

[22] Filed: Dec. 12, 1997

[51] Int. Cl.[7] ................................................. F02C 7/232
[52] U.S. Cl. ............................... 137/118.06; 60/134
[58] Field of Search ............... 60/734, 739; 137/118.02, 137/118.06

[56] References Cited

U.S. PATENT DOCUMENTS

| | | | |
|---|---|---|---|
| 2,963,862 | 12/1960 | Jay | 60/739 |
| 4,057,073 | 11/1977 | Adams | 137/118 |
| 4,226,365 | 10/1980 | Norris et al. | 60/734 |
| 4,232,701 | 11/1980 | Adachi | 137/101 |
| 4,287,906 | 9/1981 | Green et al. | 137/118 |
| 4,394,811 | 7/1983 | Swick | 60/39.28 |
| 4,541,451 | 9/1985 | Wittren et al. | 137/118 |
| 4,604,981 | 8/1986 | Dazzi | 123/451 |
| 4,614,202 | 9/1986 | Halvorsen et al. | 137/118 |
| 4,616,671 | 10/1986 | Steinkuhl et al. | 137/101 |
| 4,625,751 | 12/1986 | Gage | 137/118 |
| 5,442,922 | 8/1995 | Dyer et al. | 60/739 |
| 5,448,882 | 9/1995 | Dyer et al. | 60/39.281 |
| 5,711,145 | 1/1998 | Perkey | 60/734 |
| 5,941,074 | 8/1999 | Schultz | 60/734 |

FOREIGN PATENT DOCUMENTS

| | | |
|---|---|---|
| 2 125 110 | 2/1984 | United Kingdom . |
| WO 94/15084 | 7/1994 | United Kingdom . |

*Primary Examiner*—Louis J. Casaregola
*Attorney, Agent, or Firm*—Larry J. Palguta

[57] ABSTRACT

A combination pressurizing valve (27) and fuel flow divider for a gas turbine is operable in three different fuel distribution modes utilizing three windows which are successively opened to control the flow distribution to the engine atomizing or start-up nozzles (23) and engine air blast or running nozzles (25) respectively by way of two fixed orifices (51, 55) in a way that satisfies the start-up flow distribution favoring the atomizing nozzles (23) as well as the need for balanced flow distribution between the different types of engine nozzles after a successful start. The first window position corresponds to an engine ignition mode and includes a range of intermediate valve spool (33, 133) positions where one outlet port (57) is open and the other outlet port (67) receives a restricted flow of fuel. The second window position includes a range of valve spool (33, 133) positions where the one outlet port (57) is open and the other outlet port (67) is open to receive a flow of fuel greater than the restricted flow. The third window position corresponds to a full power engine condition and includes a range of valve spool (33, 133) positions including the another extreme position where the one outlet port (57) is open and the other outlet port (67) is open to receive a still further increased flow of fuel.

10 Claims, 6 Drawing Sheets

FUEL FLOW DIVIDER AND PRESSURIZING VALVE FOR GAS TURBINE

The present invention relates generally to methods and apparatus for fuel flow control and more particularly to a fuel control valve which provides both a pressurizing function and a fuel dividing or distributing function. As a specific preferred environment, the present invention is described in the context of a fuel flow control for supplying fuel to starting or atomizing nozzles as well as to running or air blast nozzles in an aircraft gas turbine or similar engine.

In aircraft fuel control systems, accurate control of the distribution of fuel flow for starting purposes and subsequent running conditions is important both for precise engine control and for fuel economy. It is common to control or maintain constant the head or pressure differential across a fuel system metering valve by diverting part of the output from a fuel pump back to the inlet of that fuel pump. In such known systems, a pressurizing valve is located downstream from the metering valve to provide one reference pressure for controlling the head. When applied to engines having separate lines to starting and running nozzles, the conventional approach is to utilize additional pressurizing valves in each line downstream of a flow dividing valve itself located downstream of the main pressurizing valve. Some systems of this type have eliminated one of the pressurizing valves downstream of the flow dividing valve with limited success.

A common approach to accurately control fuel flow is measuring the flow and controlling a variable orifice metering valve accordingly. A typical system has a fuel pump supplying fuel from a tank by way of the metering valve and a subsequent pressurizing valve to an engine. An electronic control receives commanded fuel flow as well as a measure of actual fuel flow from a flow meter and controls the metering valve to maintain the two values for fuel flow close to one another.

As described in copending application Ser. No. 08/540,509 filed Oct. 10, 1995, the separate flow meter is eliminated while its function is retained by monitoring the position of the pressurizing valve spool. This copending application also suggests that the typical separate valves for supplying fuel to separate engine manifolds with low level fuel supplies being directed only to a primary manifold while both primary and secondary manifolds receive fuel at higher flow rates be replaced by the same single pressurizing valve whose spool position indicates fuel flow. While this valve system performs its intended function admirably, it is relatively complex and costly.

It would be highly desirable to provide a relatively simple valve structure with a minimum number of moving parts which combines the separate valves while maintaining the ability to direct fuel to only one, or to both sets of nozzles as desired. It would also be highly desirable to provide a high degree of seal integrity within such a valve.

The accumulation of fuel, such as by leakage, in the combustor of an engine when the engine is not in operation is undesirable and sometimes dangerous. Since the pressurizing valve is frequently the last valve in the fuel supply system prior to the engine nozzles, it would be advantageous to isolate the output flow of the valve from inlet fuel pressure when the valve is closed so as to minimize the likelihood of leakage.

The present invention overcomes the prior art problems and achieves the aforementioned goals by controlling the supply of fuel to starting or atomizer nozzles and to running or air blast nozzles of a gas turbine engine using one relatively light weight, low cost valve.

In accordance with one form of the invention, a pressurizing valve has a housing including a sidewall inlet port and at least two sidewall outlet ports. A movable valve spool having a hollow interior is reciprocably disposed within the valve housing. The spool has one extreme position where both sidewall outlet ports are closed to prevent fuel flow to the engine and another extreme position where both sidewall outlet ports are open for full fuel flow from the inlet port, through the hollow spool interior and out both outlet ports to the engine. The valve housing is closed at each end by an endwall with one endwall including an annular face seal for engaging one end of the valve spool to prevent fuel from entering the hollow spool interior from the sidewall inlet port when the valve spool is in the one extreme or closed position.

In accordance with another aspect of the invention, a pressurizing valve for an aircraft fuel supply system has a valve housing and a movable valve spool disposed within the valve housing. The valve spool has one extreme position where all outlet ports are closed to prevent fuel flow to the engine, another extreme position where all outlet ports are open for full running fuel flow to the engine, a first range of intermediate positions where one outlet port is open and the other outlet port receives a restricted flow of fuel, a second range of positions where the one outlet port is open and the other outlet port is open to receive an increased flow of fuel, and a third range of positions including the another extreme position where the one outlet port is open and the other outlet port is open to receive a still further increased flow of fuel.

The present invention comprises a pressurizing valve for use in a fuel control system for supplying fuel to an engine, the pressurizing valve having a valve housing including a sidewall inlet port and at least two sidewall outlet ports, one sidewall outlet port adapted to supply start-up fuel to the engine and the other sidewall port adapted to supply running fuel to the engine, a movable valve spool disposed within the valve housing for reciprocable motion along an axis, the valve spool having one extreme position where both sidewall outlet ports are closed to prevent fuel flow to the engine, another extreme position where both sidewall outlet ports are open for running fuel flow to the engine, a first range of intermediate positions for engine start-up where one outlet port is open and the other outlet port receives a restricted flow of fuel, a second range of positions where the one outlet port is open and the other outlet port is open to receive an increased flow of fuel greater than the restricted flow of fuel, and a third range of positions including said another extreme position where the one outlet port is open and the other outlet port is open to receive a still further increased flow of fuel greater than the increased flow.

Corresponding reference characters indicate corresponding parts throughout the several views of the drawing.

Figure 1:
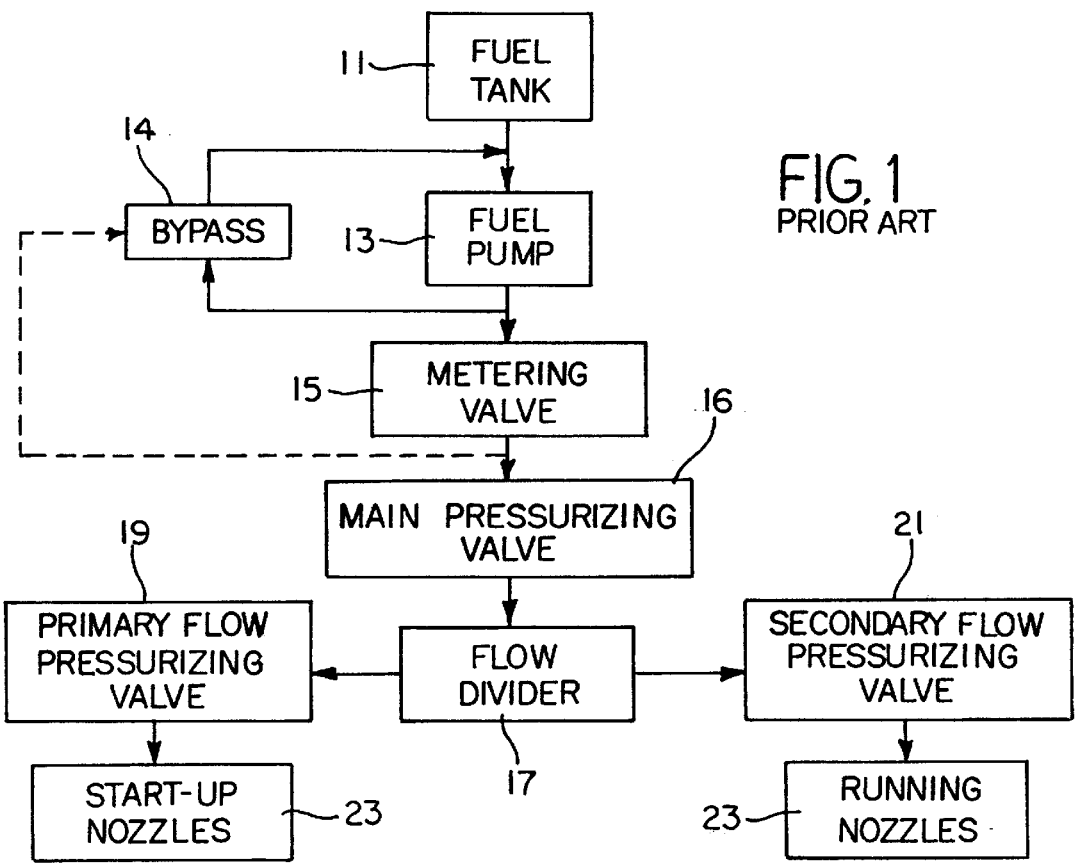
FIG. 1 is a schematic representation of a prior art aircraft fuel system.

In FIG. 1, a conventional aircraft fuel supply system includes a fuel supply tank 11 from which fuel is fed by pump 13 to a variable orifice metering valve 15 and the flow from that metering valve, after passing through a main pressurizing valve 16, is directed by a flow divider 17 to individual pressurizing valves 19 and 21. Fuel flow from these pressurizing valves is to a set of start-up nozzles 23 and a set of running nozzles 25 located in a turbojet engine combustor (not shown). The main pressurizing valve 16 maintains a reference pressure level on the downstream side of the metering valve 15 so that the pressure drop across the metering valve may be maintained at a constant (in some cases, a controlled or determinable level). At relatively lower fuel flow deliveries to the nozzles, excess fuel is diverted and returned to the inlet of fuel pump 13 by a bypass valve 14, as needed to maintain a constant head or pressure drop across the metering valve. As noted earlier, omission of one or even both pressurizing valves 19 and 20 has been attempted with some limited success and in one instance, the functions of the flow divider, pressurizing valves and fuel flow measuring device have all been incorporated into a single unit.

The illustrative gas turbine engine design may include several types of dissimilar nozzles located within the combustor region of the engine to optimize engine performance during different engine operating modes or engine speed ranges. These may include the start-up nozzles 23, running nozzles 25 as well as some hybrid nozzles possessing some design characteristics or traits of each.

Figure 2:
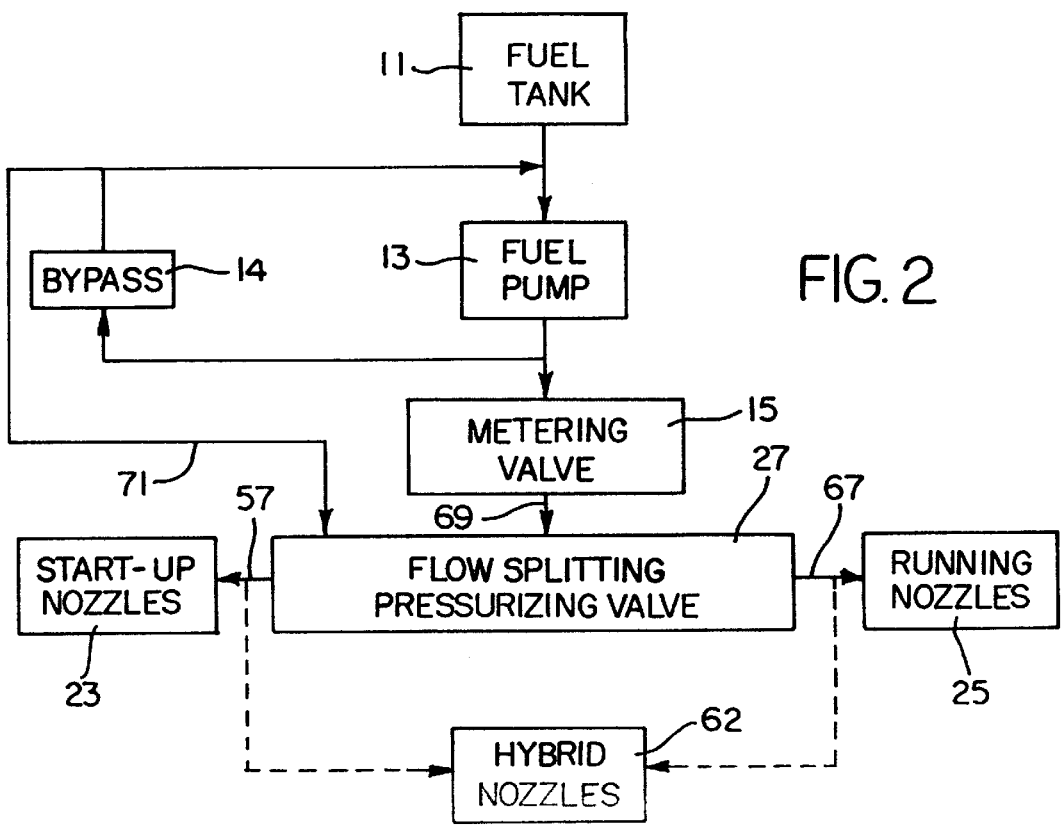
FIG. 2 is a schematic representation of an aircraft fuel system similar to that of FIG. 1, but modified according to the present invention.

In FIG. 2 and in accordance with the present invention, the flow divider 17 and all three pressurizing valves 16, 19 and 21 are replaced with one flow splitting pressurizing valve 27. Optional hybrid nozzles 62 may receive fuel from both lines 57 and 67. The flow splitting pressurizing valve 27 receives fuel from the variable orifice metering valve 15 by way of line 69 shown in greater detail as a sidewall inlet port of the pressurizing valve 27 as seen in FIG. 3.

Figure 4:
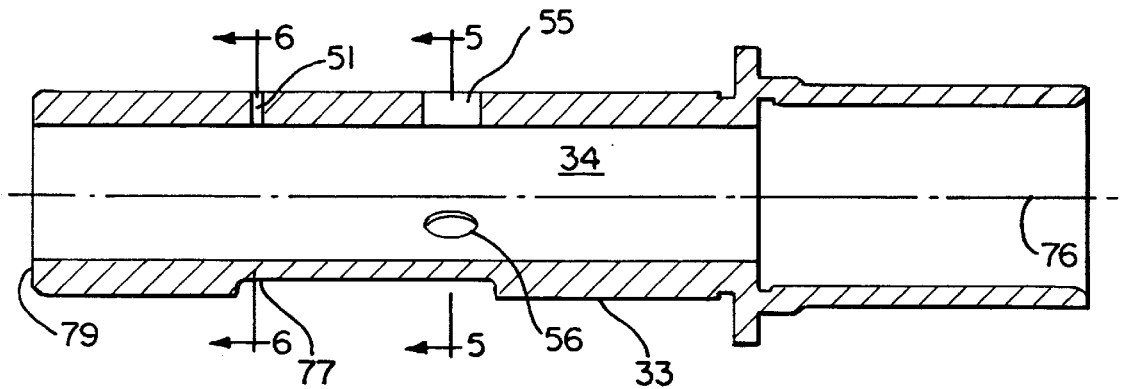
FIG. 4 is a cross-sectional view of the reciprocable valve spool taken along view lines 4—4 of FIGS. 5 and 6.
Figure 5:
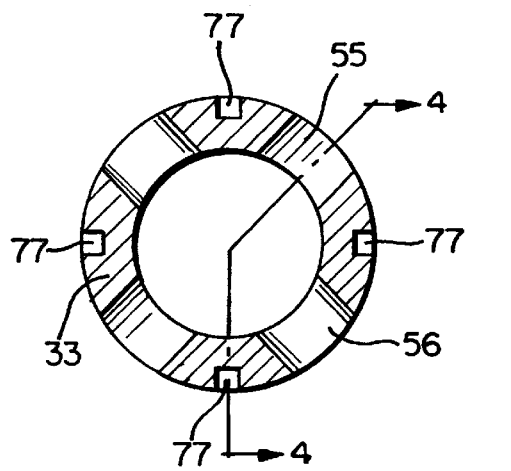
FIG. 5 is a cross-sectional view along lines 5—5 of FIG. 4.
Figure 6:
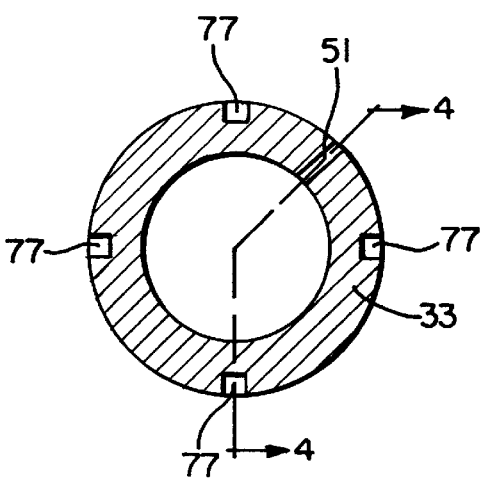
FIG. 6 is a cross-sectional view along lines 6—6 of FIG. 4.
Figure 11:
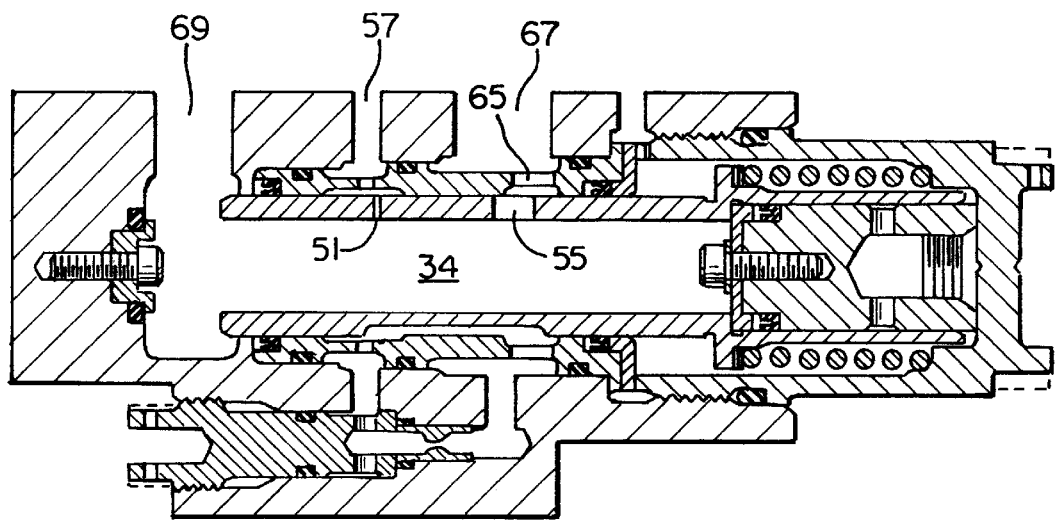

Pressurizing valve 27 includes the valve housing 29, the inlet port 69 along with a pair of outlet ports 57 and 67. Outlet port 57 is coupled to the start-up nozzles and outlet port 67 is coupled to the running nozzles as shown in FIG. 2. A reciprocable valve spool 33 shown alone in FIGS. 4–6 is located within the valve housing 29 for reciprocable motion along the axis 76 between its extreme or end positions. In one extreme position as shown in FIG. 11, both sidewall outlet ports 57 and 67 are open for full fuel flow to the start-up and running nozzles. The valve spool 33 is shaped generally like a hollow cylindrical shell and the hollow interior 34 provides a fuel path from the fuel inlet 69 to the first sidewall opening or aperture 51 and from there to the outlet port 57 as well as to the fuel inlet restrictor or aperture 61 and to second sidewall openings or apertures such as 55 and 56, and outlet port 67. In the other extreme position as shown in FIG. 3, both sidewall outlet ports are closed to prevent fuel flow to the engine nozzles.

Figure 3:
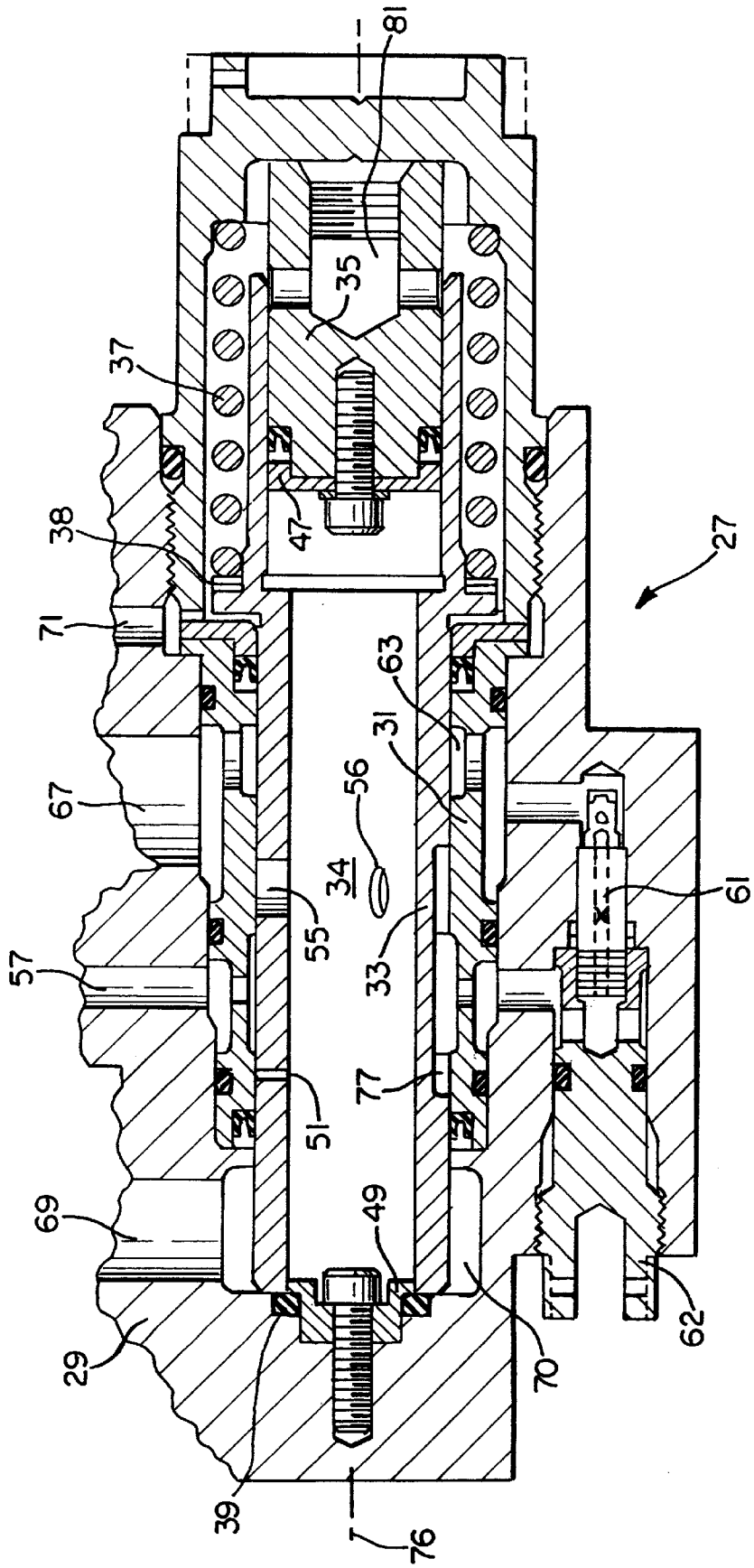
FIG. 3 is a cross-sectional view of the flow splitting pressurizing valve of FIG. 2.
Figure 7:
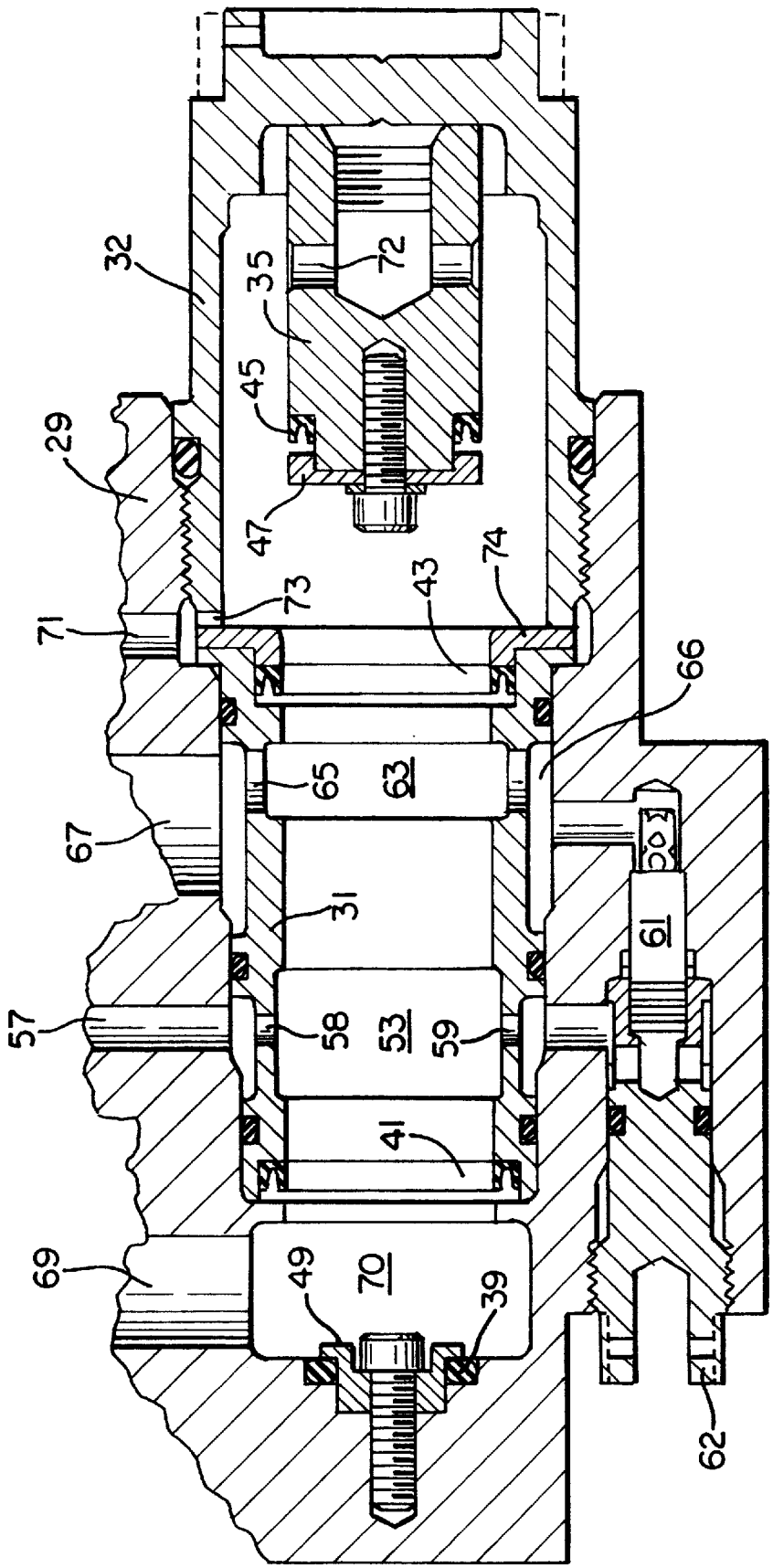
FIG. 7 is a cross-sectional view of the valve of FIG. 3 with the spool of FIG. 4 removed therefrom.

Referring primarily to FIG. 3 and to FIG. 7 from which the spool valve 33 has been removed, the pressurizing valve housing 29 includes a generally cylindrical cavity and a cavity insert 31 again generally shaped as a cylindrical shell. There is an annular conduit or annulus 70 which connects to the inlet port 69, another annular conduit 53 communicating with outlet port 57 and a third annular conduit 63 communicating with outlet port 67. As seen in FIG. 3, these three annular conduits surround the valve spool 33. There are also several relieved regions such as 77 (best seen in FIGS. 4–6) on the outer surface of the valve spool 33 which serve to connect annular conduits or annuli 53 and 63 in a range of valve spool positions as illustrated in FIG. 11 so that fuel may flow from the inlet 69, through the hollow valve spool interior 34, through aperture 51, along the longitudinal slots such as 77, into annular conduit 63 and to the blast nozzles 25 from outlet port 67 as well as to the start-up nozzles 23 by way of annular conduit 53 and outlet port 57.

Still referring primarily to FIGS. 3 and 7, the cylindrical cavity of the valve housing is closed at its ends by respective endwalls. The left endwall has an annular seal 39 fixed in an annular slot by the retainer 49 for engaging and sealing the annular end 79 of the valve spool 33 so as to prevent fuel from entering the valve spool hollow interior 34 when the valve spool is in the closed position of FIG. 3. Near the right end of the housing cylindrical cavity is located a piston 35 sized to limit the area of pressure application on valve spool 33 and which is reciprocable within the righthand portion of the hollow valve spool interior 34. While piston 35 is illustrated in FIG. 7, it would not maintain the illustrated position since it requires the presence of valve spool 33 for support. The piston 35 includes a seal 45 which engages slidingly the valve spool interior sidewall to isolate the hollow interior 34 from a low pressure reference region 81 (comprises the interior of piston 35 and the area between the spool 33 and housing portion 32 which contains spring 37) which receives return pressure fuel from the low pressure side of the fuel pump 13 by way of port 71, bleed hole 73, and piston sidewall ports 72. Seal 45 is held captive by retainer 47 and piston 35.

Two additional annular valve spool seals 41 and 43 are supported in part by the cavity insert 31. These seals sliding engage the valve spool 33 to prevent fuel from passing between the spool 33 and the insert 31. Seals 45, 41 and 43 are illustrated as spring energized, low drag polytetrafluoroethylene seals, but other types of dynamic seals may be used. Seal 41 is captured between the housing 29 and insert 31. Seal 43 is captured between insert 31 and the annular washer 74 which, in turn, is held in position by the housing portion 32 which threadedly engages housing 29. Seal 45 is captive between piston 35 and retainer 47. Thus, all three seals are held captive between two separable valve parts. This facilitates assembly and minimizes seal distortion during valve assembly thereby enhancing seal integrity.

Still referring to FIG. 3, the valve spool 33 is maintained in the closed position by a helical spring 37, with load adjustment shims 38, which engages the valve spool 33 and the righthand endwall or housing portion 32. This spring 37 urges the valve spool end 79 (FIG. 4) into sealing engagement with the annular seal 39 and is axially compressed providing a desired pressurizing valve back pressure when the valve spool moves from the closed position of FIG. 3 to one of the open positions of FIGS. 8–11. Load adjustment shims 38 are used to calibrate the desired pressurizing valve back pressure by altering the spring load. Rightward movement of the valve spool 33 and opening of the valve is caused by fuel pressure against the annular valve spool end 79, not all of which is covered by the seal 39 when the valve is closed.

Figure 8:
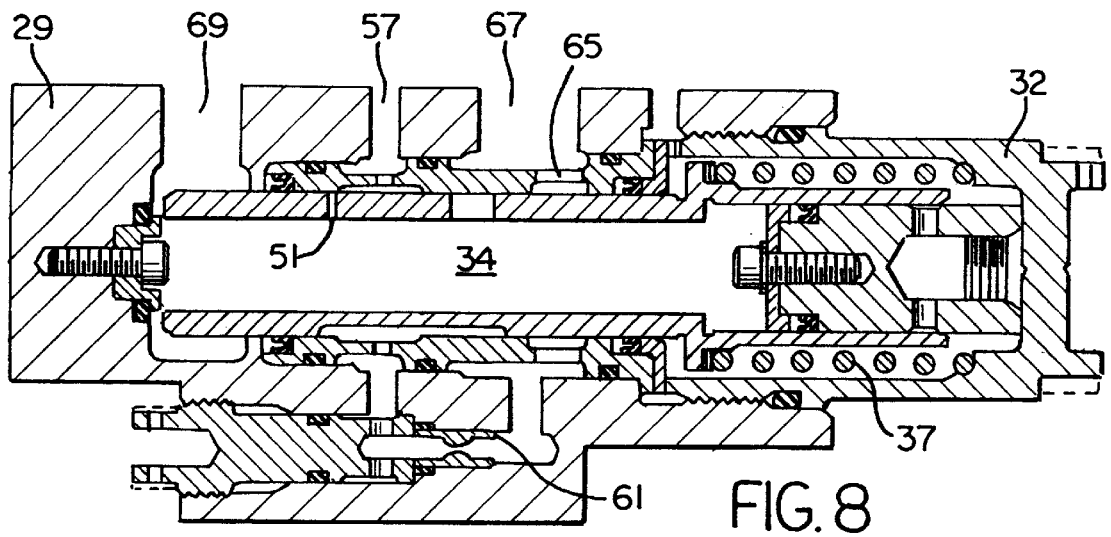
FIGS. 8–11 are somewhat simplified cross-sectional views of the valve of FIG. 3 illustrating the sequential operation thereof.

FIGS. 8–11 illustrate valve spool positions as the valve sequentially increases the overall quantity of fuel being supplied to an engine, and with coil spring 37 exerting greater and greater back pressures. FIG. 8 is illustrative of the beginning of a first range of valve spool intermediate positions where outlet port 57 is open to receive fuel from supply port 69 by way of the hollow spool interior 34, first sidewall aperture 51, annulus 53 and the insert 31 openings such as 58 and 59. In this range of positions, outlet port 67 is open to receive a restricted flow of fuel from annulus 53 and openings 58 and 59 of insert 31 through flow restricting aperture 61 and annulus 66. The flow restrictor 61 is sealed and held in position by a retention cap 62. Alternatively, the flow restrictor may, in some cases, be located anywhere between ports 57 and 67. The flow restricting device 61/62 provides the only fuel flow connection between the annular conduits 53 and 63 in this range of valve spool positions.

Figure 9:
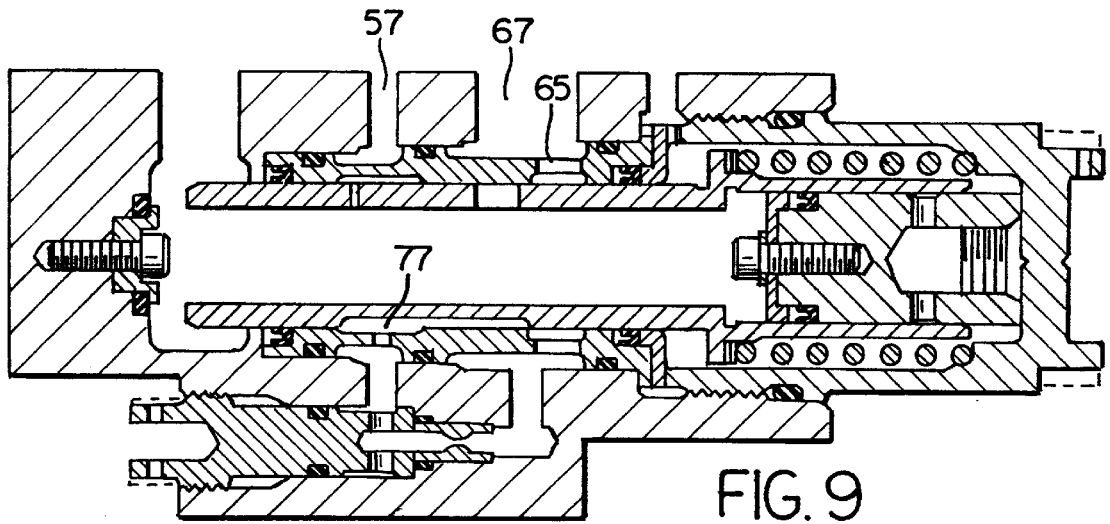
Figure 10:
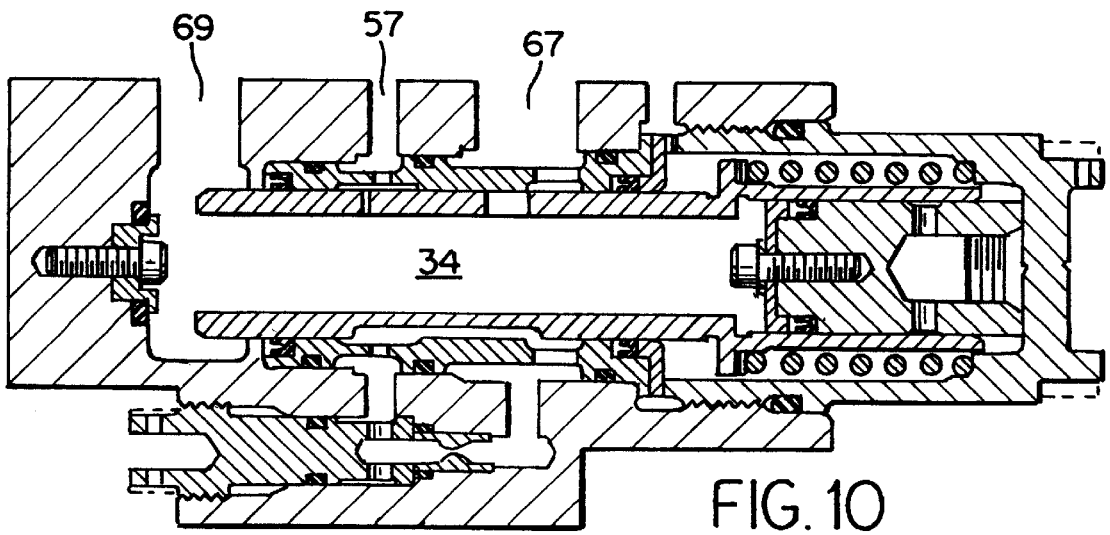

FIGS. 9 and 10 are illustrative of a second range of valve spool positions where again outlet port 57 is open for fuel flow along the previously recited route while the other outlet port 67 is now open to receive an increased flow of fuel. In FIG. 9, the valve spool exterior slots 77 are just about to open a flow path from annular conduit 53 to the annular conduit 63. This time, fuel flows from annulus 53 directly to 63 rather than between the two by way of the flow restrictor device 61/62 (see FIG. 10).

FIG. 11 illustrates the completion of a third range of valve spool positions which range includes the one extreme position where both outlet ports 57 and 67 are open to supply fuel to the engine. In this position, outlet port 67 and the air blast or running nozzles 25 receive a still further increased flow of fuel. This greatest fuel flow is by way of the hollow spool interior 34 directly out a second set of sidewall openings such as 55 and 56 to the annular conduit 63 and out opening 65 to annulus 66 and port 67.

Figure 12:
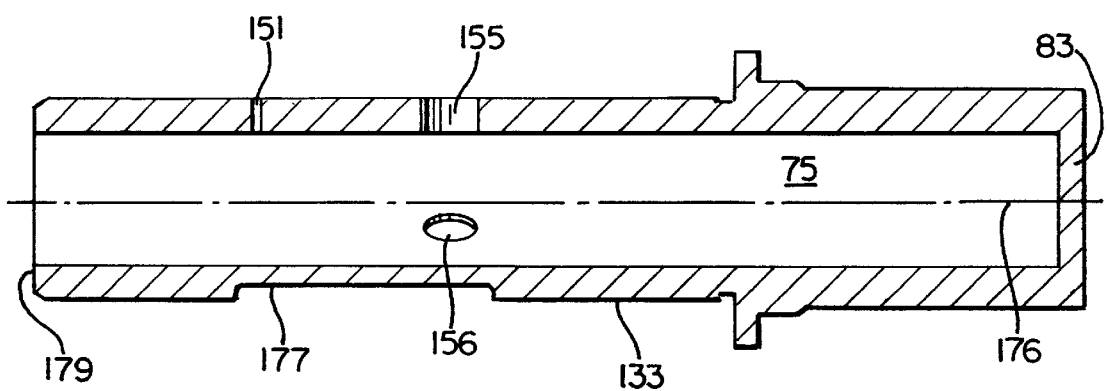
FIG. 12 is a view in cross-section similar to FIG. 4, but illustrating a modified reciprocable valve spool.

Piston 35 may be omitted from the valve of FIG. 3 and the valve spool 33 replaced by the modified valve spool 133 of FIG. 12. Analogous features in FIG. 12 bear reference numerals 100 greater than their counterparts in FIG. 4. The primary difference between these valve spools is the central bore 75 now terminates at a spool end wall 83. The bore of FIG. 12 is a blind hole while the bore of valve spool 33 extends clear through the spool. With the spool 133, as fuel pressure is applied and the spool begins to move toward the right, that pressure is applied to a much greater valve spool area including both the annulus 179 and the circular area of the end 83. The area of pressure application with spool 33 was effectively limited by piston 35 to the annulus 79. The resultant force on the spool 133 is far larger. A much larger and heavier spring would now be required to oppose the effect of the fuel pressure. The avoidance of needing such a larger and heavier spring is the purpose of piston 35. However, recall that low pressure reference region 81 of FIG. 3 receives return pressure fuel from the low pressure side of the fuel pump 14 by way of port 71. In those applications where a significantly higher regulated fuel pressure is readily available, that higher regulated pressure may be applied to port 71. The pressure differential across the spool 133 will again be manageable by a modestly sized spring and the piston 35 may be omitted.

In summary, these ranges of valve spool positions provide windows and the back pressure generated by the total fuel flow positions the pressurizing valve spool thereby triggering the opening of each successive window when the appropriate pressure is reached. There is no need to close the previously opened windows before reaching higher flow levels, thereby minimizing the criticality of the valve timing.

What is claimed is:

1. A pressurizing valve for use in a fuel control system for supplying fuel to an engine, the pressurizing valve having a valve housing including a sidewall inlet port and at least two sidewall outlet ports, one sidewall outlet port adapted to supply start-up fuel to the engine and the other sidewall port adapted to supply running fuel to the engine, a movable valve spool disposed within the valve housing for reciprocable motion along an axis, the valve spool having a hollow spool interior and having one extreme position where both sidewall outlet ports are closed to prevent fuel flow to the engine and another extreme position where both sidewall outlet ports are open for full fuel flow from the inlet port through the hollow spool interior and out both outlet ports to the engine, the valve housing being closed at each end by an endwall, one endwall including an annular seal for engaging one end of the valve spool to prevent fuel from entering the hollow spool interior from the sidewall inlet port when the valve spool is in said one extreme position.

2. The pressurizing valve of claim 1, further comprising a piston reciprocably movable within the hollow valve spool interior near a spool end opposite said one end of the valve spool, the piston including a seal slidingly engaging a valve spool interior sidewall for preventing fuel from axially exiting the hollow spool interior.

3. The pressurizing valve of claim 1, wherein the valve spool includes a closed end.

4. A pressurizing valve for use in a fuel control system for supplying fuel to an engined the pressurizing valve having a valve housing including a sidewall inlet port and at least two sidewall outlet ports, one sidewall outlet port adapted to supply start-up fuel to the engine and the other sidewall port adapted to supply running fuel to the engine a movable valve spool disposed within the valve housing for reciprocable motion along an axis, the valve spool having one extreme position where both sidewall outlet ports are closed to prevent fuel flow to the engine, another extreme position where both sidewall outlet ports are open for running fuel flow to the engine, a first range of intermediate positions where one outlet port is open and the other outlet port receives a restricted flow of fuel, a second range of positions where the one outlet port is open and the other outlet port is open to receive an increased flow of fuel greater than the restricted flow of fuel, and a third range of positions including said another extreme position where the one outlet port is open and the other outlet port is open to receive a still further increased flow of fuel greater than the increased flow of fuel.

5. The pressurizing valve of claim 4, wherein the pressurizing valve housing includes a generally cylindrical cavity and a cavity insert in generally the shape of a cylindrical shell, the valve spool being reciprocably received within the cavity insert, the cylindrical cavity including a first annular conduit communicating with the inlet port, a second annular conduit communicating with said one outlet port, a third annular conduit communicating with said other outlet port, and a relieved region on the outer surface of the valve spool for coupling the second and third annular conduits for fuel flow therebetween only in the second range of valve spool positions.

6. The pressurizing valve of claim 4, wherein the valve spool is generally shaped as a hollow cylindrical shell with a hollow spool interior thereof providing a portion of fuel paths from the inlet port to the one and other outlet ports, and the valve spool including a first sidewall opening for conveying fuel from the hollow spool interior to the second annular conduit when the valve spool is in any one of the first, second and third ranges of positions and a second sidewall opening for conveying fuel from the hollow spool interior to the third annular conduit when the valve spool is in the third range of positions.

7. The pressurizing valve of claim 5, further comprising flow restricting orifice means providing the only communication between the second and third annular conduits for fuel flow therebetween in the first range of valve spool positions.

8. The pressurizing valve of claim 4, wherein the valve housing is closed at each end by a pair of endwalls, one endwall including an annular seal for engaging one end of the valve spool to prevent fuel from entering the hollow spool interior from the sidewall inlet port when the valve spool is in said one extreme position, and further comprising a piston reciprocably movable within the hollow spool interior near a spool end opposite said one end of the valve spool, the piston including a seal slidingly engaging a valve spool interior sidewall for preventing fuel from axially exiting the hollow interior.

9. The pressurizing valve of claim 8, further comprising a helical spring engaging the valve spool and the endwall opposite said one endwall for urging the one end of the valve spool into sealing engagement with the annular seal, the helical spring being axially compressed when the valve spool moves from said one extreme position to provide a desired pressurizing valve back pressure.

10. The pressurizing valve of claim 4, wherein the valve spool includes a closed end.

\* \* \* \* \*